(12) United States Patent
Katz

(10) Patent No.: US 6,834,294 B1
(45) Date of Patent: Dec. 21, 2004

(54) METHODS AND SYSTEMS FOR PROVIDING AND DISPLAYING INFORMATION ON A KEYBOARD

(75) Inventor: Samuel F. Katz, Givat Ze'ev (IL)

(73) Assignee: Screenboard Technologies Inc., Jerusalem (IL)

(*) Notice: Subject to any disclaimer, the term of this patent is extended or adjusted under 35 U.S.C. 154(b) by 367 days.

(21) Appl. No.: 09/709,248

(22) Filed: Nov. 10, 2000

Related U.S. Application Data

(60) Provisional application No. 60/164,792, filed on Nov. 10, 1999.

(51) Int. Cl.[7] .................. G06F 15/173; H03K 17/94
(52) U.S. Cl. .............. 709/203; 709/217; 709/219; 341/22; 341/23
(58) Field of Search ................ 709/201–203, 709/225–226, 217–219, 227–229; 341/22–24

(56) References Cited

U.S. PATENT DOCUMENTS

| | | | |
|---|---|---|---|
| 4,823,311 A | 4/1989 | Hunter et al. | |
| 4,853,697 A | 8/1989 | Pellizzari et al. | |
| 5,515,045 A | 5/1996 | Tak | |
| 5,650,799 A | 7/1997 | Melen | |
| 5,774,115 A | 6/1998 | Jaeger et al. | |
| 5,786,811 A | 7/1998 | Jaeger | |
| 5,818,361 A | * 10/1998 | Acevedo ................. | 341/23 |
| 5,831,598 A | 11/1998 | Käuffert et al. | |
| 5,867,149 A | 2/1999 | Jaeger | |
| 5,900,599 A | 5/1999 | Ohashi et al. | |
| 6,281,812 B1 | * 8/2001 | Kim ........................ | 341/23 |
| 6,625,649 B1 | * 9/2003 | D'Souza et al. ........... | 709/225 |

OTHER PUBLICATIONS

PCT International Search Report, mailed Apr. 6, 2001.

\* cited by examiner

Primary Examiner—Glenton B. Burgess
Assistant Examiner—John R Brancolini
(74) Attorney, Agent, or Firm—Knobbe, Martens, Olson & Bear LLP

(57) ABSTRACT

One embodiment of the present invention is a system and method of communicating information over a network between a remote server and a client computer keyboard system. The state of the client computer and the identity of the user using the client computer are determined. Based on the computer state and the user identity, a request is made to a client-side cache for a message to be displayed on a keyboard key display and an action to be associated with the keyboard key. A determination is made as to whether the requested message and action are in the cache. Upon determining that the requested message and action are in the cache, they are retrieved from the cache and the message is displayed on the keyboard key display and the action is associated with the keyboard key. If it is determined that the requested message and action are not in the cache, a request for the message and action is transmitted to the remote server, which provides the requested message and action.

23 Claims, 10 Drawing Sheets

| VERSION | COMMAND |

PROTOCOL HEADER

*FIG. 4A*

| USER ID | OBJECT TYPE | OBJECT ID |

REQUEST TRAILER

*FIG. 4B*

| OBJECT TYPE | OBJECT ID | "THE OBJECT" |

RESPONSE TRAILER

*FIG. 4C*

| USER ID | FILE TYPE | SIZE | "THE FILE" |

SEND TRAILER

*FIG. 4D*

| 1.0 | REQUEST | 1fd5422 | MESSAGE | Hgf32Fdf |

CLIENT REQUEST

*FIG. 5A*

| 1.0 | RESPOND | MESSAGE | Hgf32Fdf | "THE MESSAGE" |

CLIENT REQUEST

*FIG. 5B*

| 1.0 | SEND | 1fd542 | LOG FILE | 20k | "LOG FILE" |

LOG FILE SEND

*FIG. 5C*

| 1.0 | ACK |

ACKNOWLEDGE

*FIG. 5D*

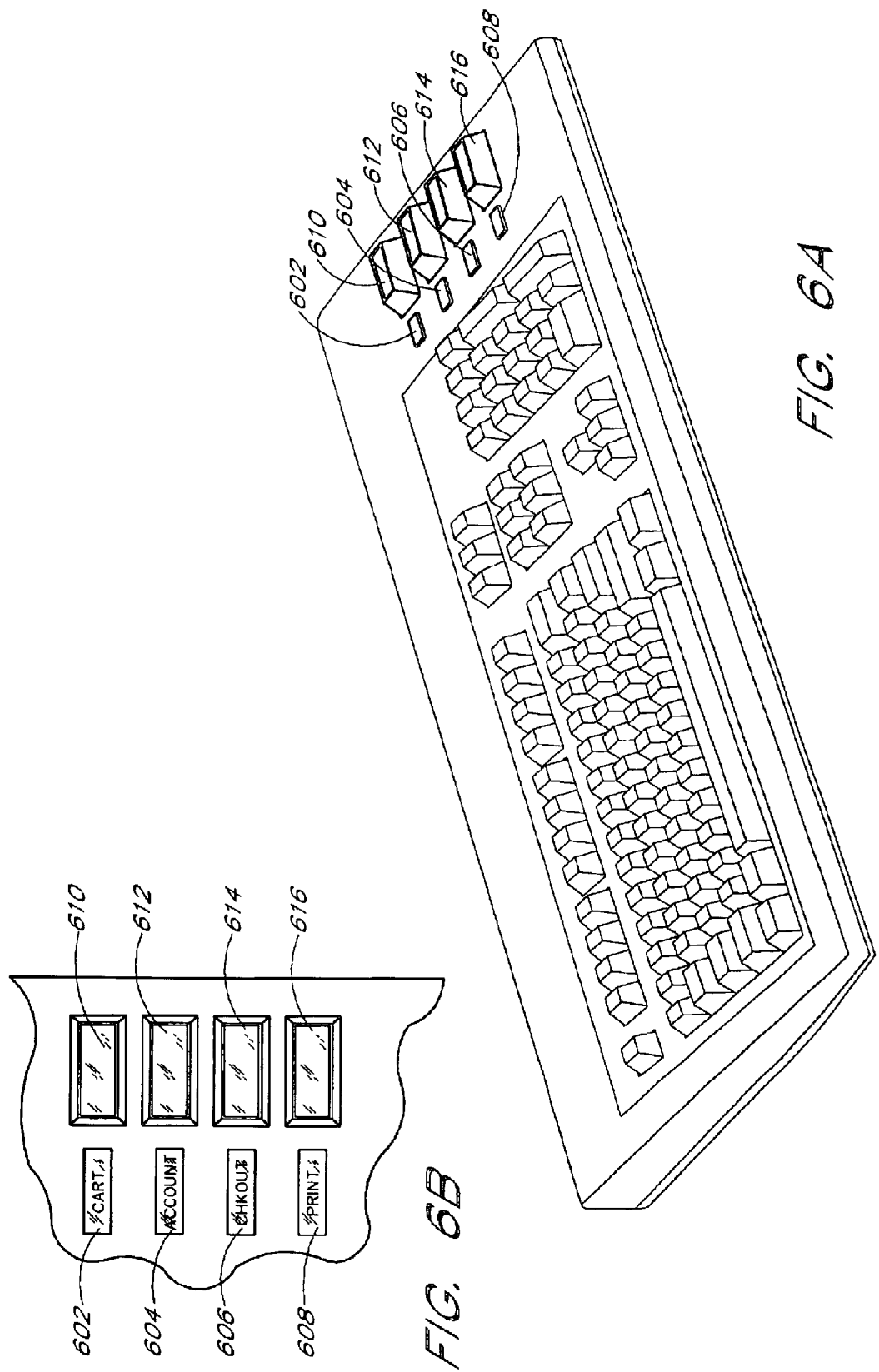

METHODS AND SYSTEMS FOR PROVIDING AND DISPLAYING INFORMATION ON A KEYBOARD

PRIORITY CLAIM

This application claims the benefit under 35 U.S.C. § 119(e) of U.S. Provisional Application No. 60/164,792, filed Nov. 10, 1999, the entirety of which is hereby incorporated by reference.

BACKGROUND OF THE INVENTION

1. Field of the Invention

The present invention is related to keyboards, and in particular, to keyboards with integral displays.

2. Background

Standard personal computer keyboards generally have fixed labeling on their keys. Thus, for example, the keyboard function keys are labeled F1, F2, F3, . . . , F12, with no other key text to describe the key functionality. While different functions may be assigned to the function keys, users generally need to either remember what functions are assigned to what keys, use a printed reference card, or use a help file stored on the personal computer and displayed on a computer monitor. Because of the associated inconvenience, users often do not use the function keys, and instead rely on using a mouse to navigate online menus. In addition, when used by a given software application, the function keys typically have a set function, limiting the adaptability of the function keys.

Further, because the keys have fixed labeling, valuable potential media space is inadequately used. For example, when surfing the Internet, information, including advertisements, is conventionally presented to a user on the user's computer monitor. These advertisements disadvantageously take up valuable monitor display space. Furthermore, the advertisements tend to go unnoticed amidst visually busy web sites. In addition, the advertisements are typically only displayed while the user is accessing the Internet, and may change as the user visits different sites. Disadvantageously, to access a site associated with the advertisement usually necessitates the use of a pointing device, where the user must first point at the advertisement and then click on the advertisement.

SUMMARY OF THE INVENTION

The present invention is generally related to keyboards, and in particular, to keyboards with integral displays. The keyboard is networked via a client computer to a message server. Data is transmitted from the message server for display on keyboard key displays. In addition, the data may be received from other user computers in a peer-to-peer transfer. Therefore, by way of example, the present invention may be used to provide content or media from a variety of sources for display on keyboard keys capable of displaying graphics and/or text. Thus, one embodiment of the present invention provides dynamic, programmable media space on computer keyboard keys or related input devices. Further, in one embodiment, the keyboard receives context sensitive messages over the network from the message server.

Using a computer keyboard having keys with programmable displays and functions in accordance with the present invention advantageously allows the keys to be used to display content and messages, to be used as personalized billboards, to display advertisements, and to perform a variety of functions. In one embodiment, the content is transferred from a first computer, such as a server, over a network, such as the Internet, to a second computer, such as a personal computer. Similarly, the key functions may be programmed over the Internet. The content and key function definitions may be received from a variety of sources, including one or more Web sites or other remote servers. The content may include URLs, links, portal names, advertisements, and the functions may cause a browser to access a particular Web site, initiate e-commerce activities, and so on.

The content displayed on the key display can be dynamic changed. For example, a stock price may be continuously updated in substantially real time on a the display key display. In another example, the key display space can be rented to advertisers on a time limited or specific basis. The advertiser can have a long-term "lease" on the key display, or a short term lease. Thus, the advertisement can be displayed while the keyboard is powered for varying amounts of time, such as seconds, minutes, hours, days, weeks, months or years, or perpetually.

Further, the displayed information is optionally persistent so that the displayed information remains displayed for a period of time even as the user is visiting different Web sites or executing different applications. The advertiser's company, product, logo, or web site name can appear on a key display as a permanent or semi-permanent sponsor of the user's keyboard. The company may provide or cause the keyboard to be provided for free or for a reduced or subsidized price in return for having the company's media content displayed on one or more key displays.

In one embodiment, the content, such as ads or other media content, can blink, flash, scroll in one or more directions, and so on, so as to better capture the user's attention. In one embodiment, content may include notices of contests or give-aways which are displayed and optionally flashed or blinked on the key displays to help keep users looking at the key displays and associated advertisement.

All or some of the keys with displays may be dedicated to advertising when the user is on the Internet. Keys not dedicated to advertising may be used by the user to launch the user's or other programmable macros to perform a desired function. Thus, in addition to being useable to display advertising, the keyboard may also be used as a conventional device.

In addition, the keys, including corresponding displayed information and programmable functions, may be used for games or other applications. The functions and displayed information may be provided by software resident on the computer associated with the keyboard, or may be first downloaded over a network.

BRIEF DESCRIPTION OF THE DRAWINGS

FIGS. 4A–4D illustrate example data message header and trailer formats;

FIGS. 5A–5D illustrate example data message formats;

FIG. 6A–C illustrate a second and third exemplary keyboard which may be used with one embodiment of the present invention.

DETAILED DESCRIPTION OF PREFERRED EMBODIMENTS

The present invention is related to keyboards, and in particular, to keyboards with integral displays. The keyboard is networked via a client computer to a server. Data is transmitted from the server for display on keyboard displays. For example, the present invention may be used to provide media for display on keyboard keys capable of displaying graphics and/or text.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code running on one or more general purpose or computers or on servers.

Following is a description of a system, including a description of an exemplary keyboard system, client system, and server system which may be utilized in accordance with the present invention.

Figure 1A:
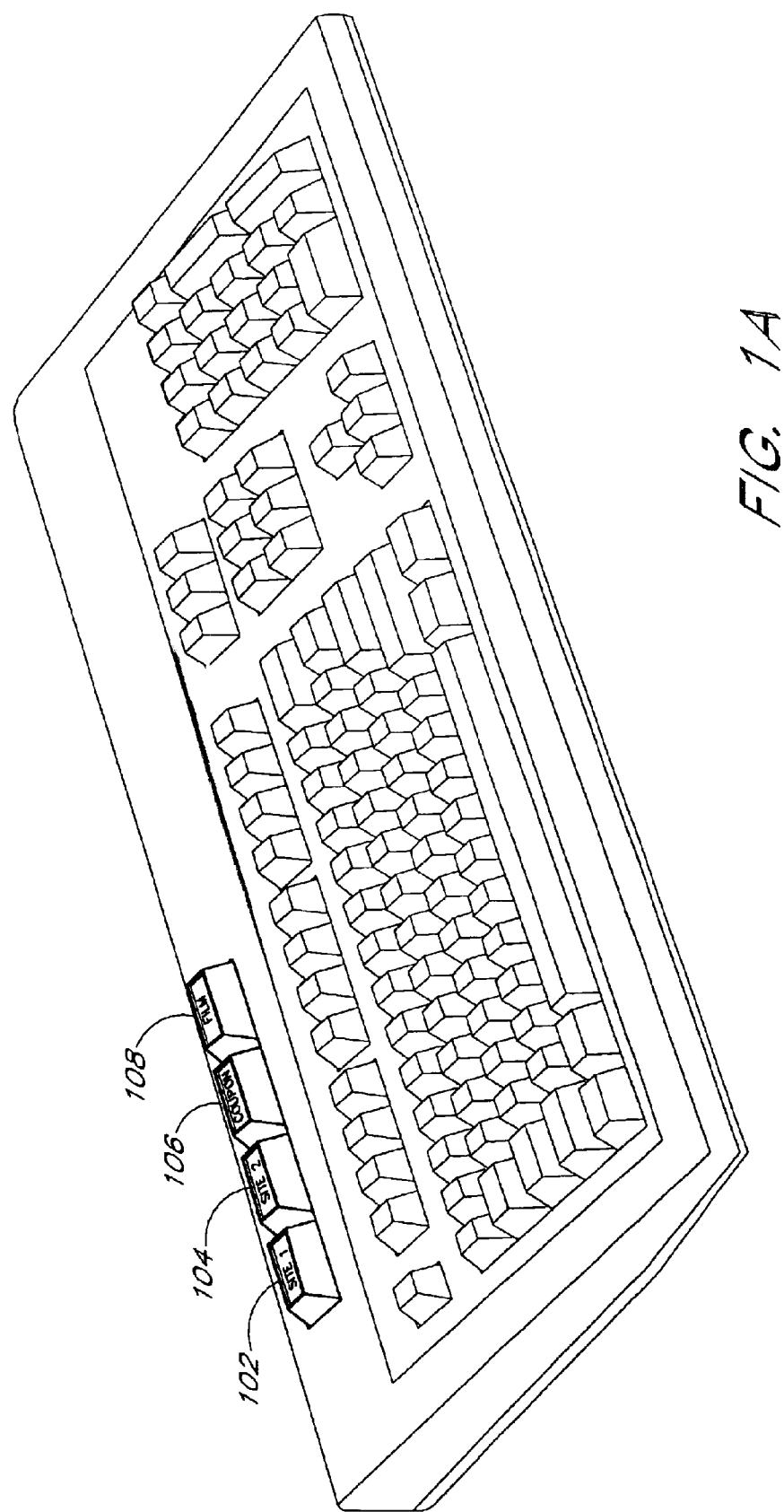
FIG. 1A illustrates an exemplary keyboard which may be used with one embodiment of the present invention.

One embodiment of the present invention advantageously displays content, such as advertisements and other media, on keyboard input devices, such as physical, depressible keys incorporating displays to thereby aid users and/or encourage users to access content sponsor's web sites. As illustrated in FIG. 1A, one example keyboard in accordance with an embodiment of the present invention includes 4 programmable display keys 102, 104, 106, 108. Of course, the number of display keys is not limited to 4, and fewer or more display keys may be used. For example, in one embodiment, two rows of 6 display keys each may be used or a single display key may be used.

Each display key's display is visible on the face of the key. In the illustrated example, the keyboard is a computer keyboard which may be connected to a separate client computer, such as a personal computer unit, via an appropriate interface and corresponding cable. As illustrated, the display keys may be located above the traditional 12 function keys. Alternatively, to better resemble conventional keyboards, the keyboard may include 12 programmable display keys in place of the conventional 12 functions keys so that the display keys keyboard will be compatible with existing programs use of the conventional function keys. As with conventional function keys, the display keys may be positioned over the ASCII portion of the keyboard or on the left side of the keyboard, so that users will be fully familiar with the keyboard layout on first use.

If the display keys are used in place of standard function keys, as a default, each of the 12 display keys will correspondingly display F1, F2, F3, F4, F5, F6, F7, F8, F9, F10, F11, F12, and will operate as standard function keys. The default programming of the keys is, in one embodiment, performed by keyboard-related client software executing on the personal computer. The client software is discussed in greater detail below. In another embodiment, the default programming of the keys is performed by a keyboard microcontroller located within the keyboard. By having the default programming performed by the keyboard controller, the keyboard can be used as a standard keyboard with any corresponding standard personal computer, including those which do not have the keyboard-related client software. If the display keys and the standard function keys are both present on the keyboard, then as a default, the display keys may correspondingly display D1–D12.

As previously discussed, the keyboard display keys can be used to display text messages and/or graphics, such as advertisements or Web site-related information. For example, the name of an advertiser, a product associated with the advertiser, coupons, and/or a web site name associated with the advertiser, may be displayed on one or more display keys. All of these types of displayed information are herein referred to generally as advertisements. In the example illustrated in FIG. 1A, display key 102 displays the name of a first site "Site 1," display key 104 displays the name of a first site "Site 3," display key 106 displays the phrase "Coupon," and display key 108 displays the name of a product "Film." As will be described in greater detail below, activation of a display key will cause an action or function to be performed associated with the displayed text or graphics. For example, depressing display key 102 will cause the user browser to display the Web site associated with the name "Site 1."

In addition, the display keys, including corresponding displayed information and programmable functions, may be used for games, to aid in the operation of electronic equipment, or other applications. The functions and displayed information may be provided by software resident on the computer associated with the keyboard, or may be first downloaded over a network.

By way of example, if a keyboard display key is programmed to display a Web site or online merchant name, depressing or activating the display key causes a browser, such as Microsoft Explorer, to be launched on the client computer if the browser is not already running, and a URL request is made to the corresponding Web site. The corresponding Web site is then displayed on the client computer display.

In addition, the functionality of a key may be changed as well to perform a function desired by an advertiser, user, or other entity. For example, keys may be used to display navigation-related images and/or text. In this example, a first display key is caused to display the text and image "page ↑" and a second key is caused to display the text and image "page ↓." When the user presses the "page ↓," a next linked Web page is called and displayed. Similarly, when the user presses the "page ↑," a previous linked Web page is called and displayed. In addition, activation of a display key can cause a corresponding application, such as a browser, to be launched and to perform a task.

In another embodiment, one or more key displays may be dynamically and interactively updated as the user accesses different sites on the Internet. For example, if the user visits an e-commerce site, such as an electronic mall, the keys may display different categories of goods, such as electronics, furniture, food and the like. When the user presses a display key displaying a name of a category of goods, the user's browser then accesses a Web page displaying the appropriate goods. Similarly, the display keys may be programmed to display Web site-related menu items, such as "Shopping Cart," "Account Info," "Checkout," "Details," and so on. When a user activates the "Shopping Cart" display key the user's shopping cart is displayed. When a user activates the "Account Info," display key the user's account information is displayed. Similarly, when a user activates the "Details" display key the additional detail information about a product is displayed.

The displayed text and functions of the display keys may change for different pages of a given Web site. For example when the user is viewing the shopping page the display keys display may be changed from the displayed text discussed above, and programmed to display text and/or graphics corresponding to shopping cart related functions, such as "Buy," "Delete," "Change Quantities," and so on. Of course, one or more of the key displays may remain constant, even though the user is navigating to different sites and/or to different Web pages within a site. For example, a first display key may display the same Web site name, regardless of which Web site is being currently visited, so that by pushing the first display key, the user is returned to the Web site corresponding to the named Web site.

In addition, when a user installs a new application on the client computer, such as Microsoft's PowerPoint®, the system detects that such a new application has been installed. A request is made to the server for content and actions related to the application. If the server locates such content and actions, the server transmits them to the client. The content is displayed on corresponding display keys and the actions are correspondingly associated with the keys. For example, in response to the installation and/or launching of Microsoft's PowerPoint®, the client system transmits a content and action request over the Internet to the server. The server in turn locates the actions and content and transmits them over the Internet to the client. By way of example, the content may include Microsoft's PowerPoint® menu items, such as "slide," "outline" and "view show," which are then displayed on corresponding client keyboard display keys. Upon activation of one of the corresponding display keys, the application is instructed to perform the function associated with the displayed content.

Using programmable keys incorporating displays as above is advantageously easier and quicker to access than having to use a mouse to navigate through multiple menus and the like on a computer screen or having to type in URLs. Thus, the user's navigation experience, application usage experience, and/or online shopping experience are greatly enhanced.

Figure 6C:
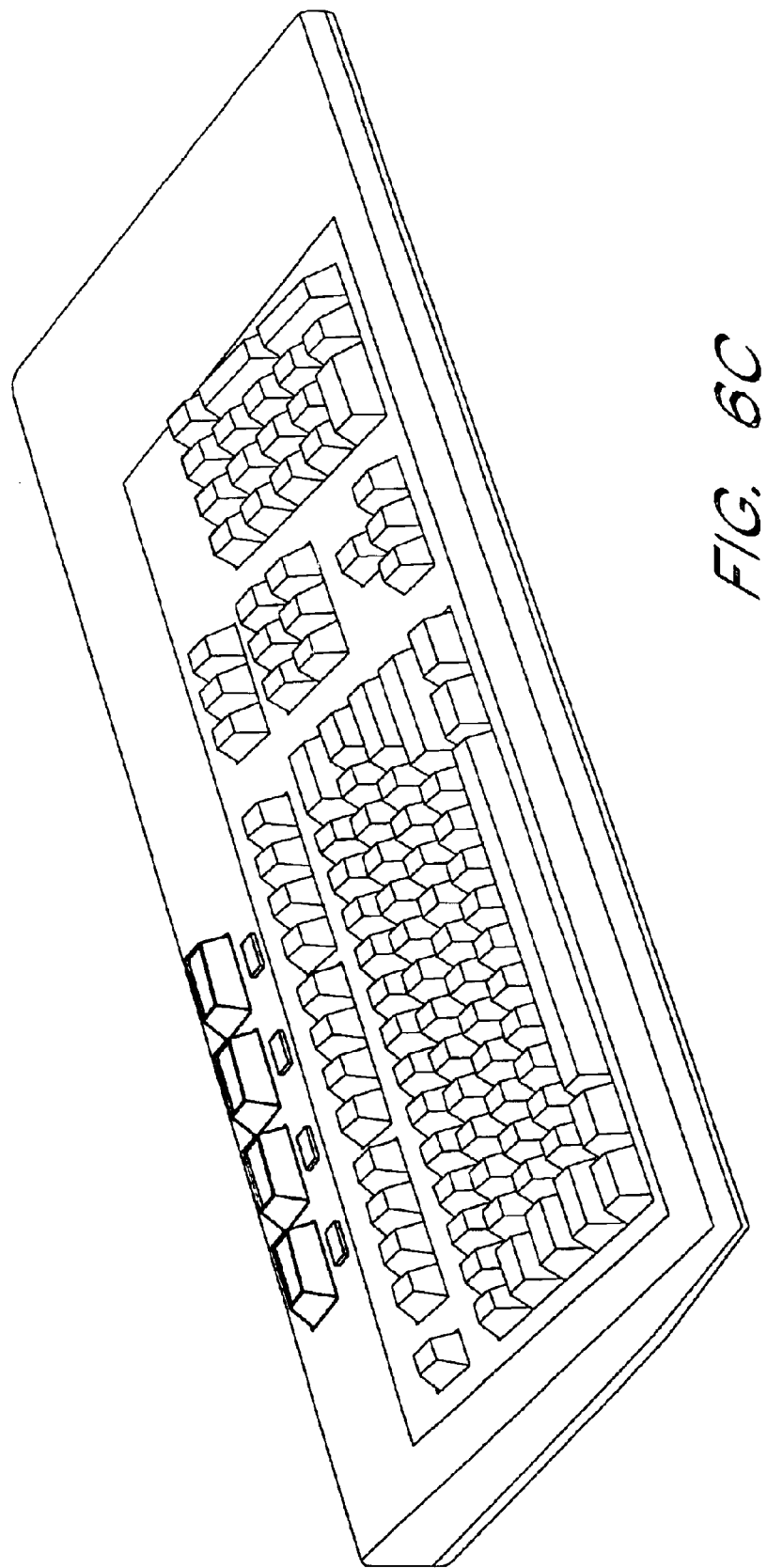

In other embodiments, the information may be displayed on displays located adjacent to keyboard keys, buttons, or other input devices, as illustrated in FIGS. 6A–C. In particular, the keyboard illustrated in FIG. 6A keys has separate displays 602, 604, 606, 608 located adjacent to corresponding keys 610, 612, 614, 616 positioned on the right side of the keyboard. Depressing a key associated with a display will cause an action or function to be performed associated with the displayed information. For example, depressing display key 610 will cause the user browser to display shopping cart information, in accordance with the text displayed on display 602, illustrated in FIG. 6B. FIG. 6C illustrates displays and corresponding separate keys located towards the top of the keyboard. In still another embodiment, the keyboard may include only display keys. For example, the keyboard may be in the form of a physically separate keypad having display keys and intended to be used alone or in conjunction with a regular keyboard. In addition, the keyboard in accordance with the present invention may be used with other devices other than a personal computer, such as personal video recorder or other consumer electronics.

In one embodiment, different users may log onto the client software so that the display key messages may be customized for different users. Thus, for example, one or more of the display keys may be reprogrammed to display the logged-in users' favorite Web site name(s).

As previously discussed, the keyboard may include a standard keyboard layout, and incorporate the keyboard display technology disclosed in U.S. Pat. No. 5,164,723. The contents of U.S. Pat. No. 5,164,723, in its entirety, is hereby incorporated by reference. Electronic displays are placed adjacent to rows of special keys. The image presented on the displays is seen through prism keycaps fitted to the keys. Thus, while the active portion of the displays are physically separate from the keys, the displayed images are seen as if inside or on the top surface of each key. Of course other display technologies, such as the use of a key incorporating an individual LCD, LED, or FED dot matrix bit-mapped display, may be used as well. The displays may be in color via the use of appropriate colored filters or the use of colored LEDs, such as red, green, and/or blue LEDs. In one embodiment, the key display is bit mapped and has a 132×32 pixel configuration, though other configurations may be used as well.

Advantageously, a log may be kept of how and when the display keys are used. This information may be analyzed to determine users access patterns, performance analysis, overall system usage analysis, usefulness of a given action/profile, debugging and the like.

Figure 2:
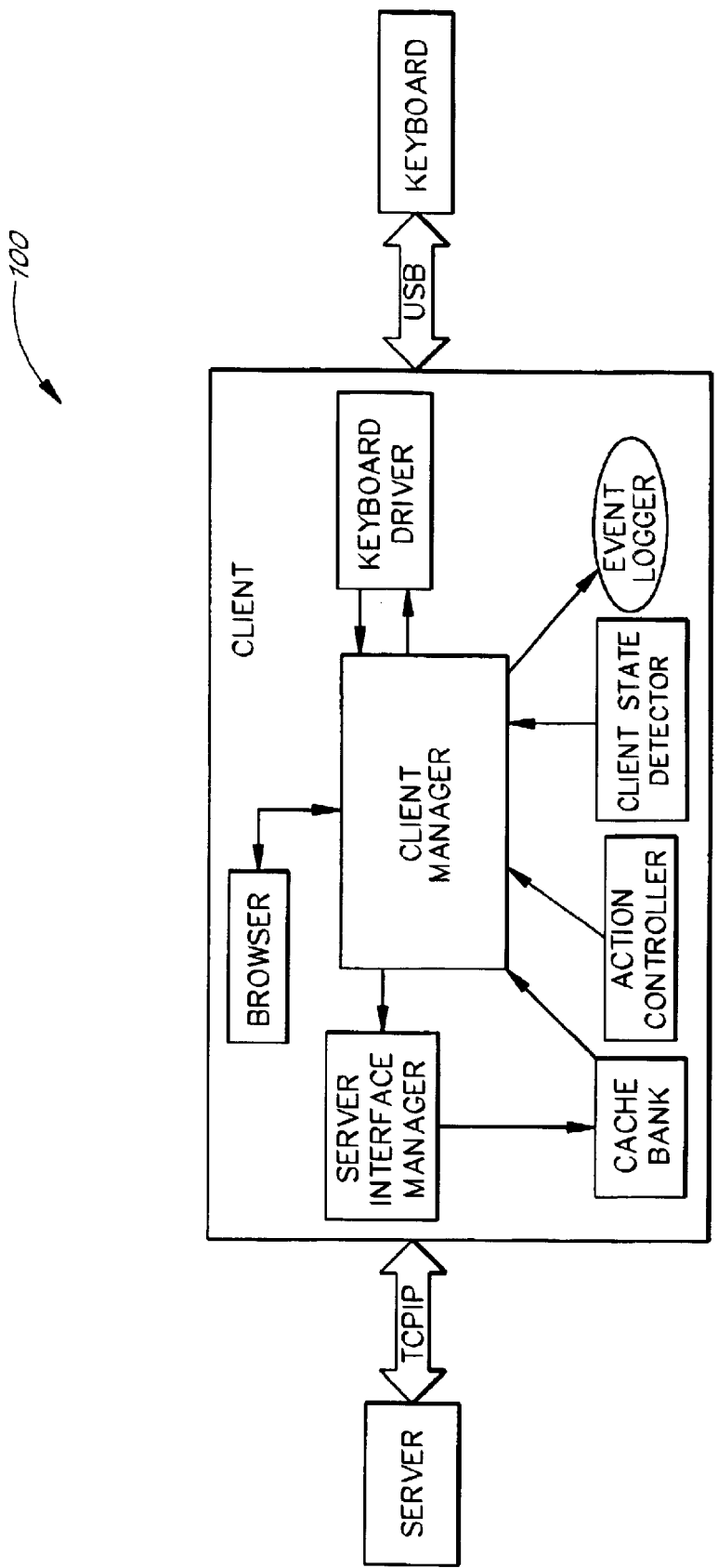
FIG. 2 illustrates an exemplary networked system which may be used with one embodiment of the present invention.

An exemplary system in accordance with the present invention will now be discussed in greater detail with reference to FIG. 2. The exemplary system includes one or more servers coupled to one or more client systems over a network. The servers may be associated with a Web site, such as an online merchant site or a site associated with the keyboard provider. The servers may use Sparc processors, Intel Pentium processors, RISC processors, and the like. The servers may use Windows NT, MAC OS, Linux, Unix, and/or SunOS operating systems, and the like. The server hardware may include mass storage devices, such as hard drives, optical drives, floppy drives, and network interfaces, such as a T1 interface, a Ethernet interface, a cable modem, a telephone modem, a cellular modem, and the like. The servers may be coupled to monitors, keyboards, and pointing devices. The servers may be used to host commerce and/or advertisement systems, software applications, and Web sites, as described below.

The client system may include a computer having a keyboard with one or more keys with programmable displays, such as that illustrated in FIG. 1. The client computer may be a Pentium/Windows-based computer, a PowerPC/MacOS-based computer, a Sparc/SunOS-based computer, a Palm OS-based computer, and EPOCH-OS based computer, or a computer using other processors and/or operating systems. In addition, the client computer may be in the form of a PDA, cell phone, or set top box. The client systems may also include both volatile and non-volatile memory, optical disk drives using optical media, magnetic disk drives, and the like. The client systems may further include network interfaces, such as a T1 interface, a Ethernet interface, a cable modem, a telephone modem, a cellular modem, and the like. The keyboard may be coupled to the client computer via any one of a number of interfaces, such as, by way of example, a standard PS/2 PC keyboard interface, a USB interface, a wireless RF or IR interface, and the like. The client may also include a standard CRT or flat panel monitor, pointing devices, network interfaces and the like.

The server and client may communicate over a network, such as the Internet, intranet, wide area network, or the like using a conventional protocol via their respective network interfaces. By way of example, if the network is the Internet, the server and client can use UDP, TCP/IP, HTTP, FTP and so on. Of course other protocols may be used as well.

As will be discussed in greater detail below, display key definitions, in the form of profiles, messages (text and/or graphics), actions may be received from the user via a scripting language or form entry, or from the networked server or other computer via a network, such as the Internet from computers associated with one or more entities. For example, the server or other computer may be associated with e-commerce sites, brokerage houses, other users, or an independent keyboard service operator. The profile includes a list of the displays keys and corresponding content or message identifiers. An action includes one or more commands, such as application commands, that are to be performed in response to a key activation and/or in response to a certain machine or client state.

The key display messages are formatted and transferred to keyboard control software for display on the keys, and the key functionality appropriately changed. In addition, the profile, messages, and actions may be updated at least partly in response to which application program is currently active. The client's currently active application is automatically recognized and the appropriate re-definition of the display keys' functionality and text or images corresponding to the active application is performed. A log or history file is created and updated to record activity related to the display keys, including the manner that the user utilizes the display keys.

The client system includes several software modules stored in the client memory, such as hard disk drive, and the modules are executed by the client computer. The exemplary client includes a server interface manager, a Client Manager module, a Client State Detector Controller, a Cache bank/proxy, and Action API (application program interface), a client-side event logger, a browser, and a keyboard USB interface. Associated with the client browser is an optional cookie module which stores a user identification code. The identification code uniquely identifies each client system and/or each user. A "cookie" is a file which stores information on the client computer for use by the remote server. In one embodiment, the cookie is automatically accessed by the server so that the user does not need to retype the user's identification code each time the server is accessed. Of course other user identification schemes, such as passwords and the like, may be used as well.

Generally, the client software manages communications with the keyboard and remote server. The client software transmits the appropriate message for display on a selected display key according to the client state. A client state, as used herein, may be the date/time as indicated by the client calendar/clock circuit, the URL Internet address that the client browser is presently at, and/or other based on what other software, such as Microsoft Word, is active, as well as the profile that was attached to that state. In particular, the client mode is translated into a client state. That is, a state is set according to the active application, and the mode within that application (e.g. Word_SaveFileMenu or Explorer_ www.yahoo.com/sports/indx.html).

In the example embodiment, each defined state has a defined profile and each defined profile has a unique ID. For undefined states, a default profile is attached. The default profile may designate that the 12 display keys correspondingly display F1–F12 or may cause display keys to display the names of popular Web sites or of specific advertisers who paid to have their names displayed on the display keys. Each profile includes definitions for one or more of the display keys, with a unique identifier (ID) for each display key being defined. The client software detects which display key is activated, and executes or activates the appropriate set of commands or actions, based at least in part on which key or keys were depressed and/or the client state. An action is a collection of key definitions (0-N keys) and/or a set of system commands to be performed. This collection of definitions and/or commands is defined using a script language. The script language is used to control the keyboard, the client operating system, and/or client applications. Thus, the actions are composed from a series of internal commands and definitions formulated into scripts. These commands include Windows shortcuts, such as URLs, Word files, programs, and SDK commands. Functionally, the script file is similar to an HTML file in that it includes commands to be performed and definitions/values of fields.

By way of example, the actions may send commands to the browser or to a Microsoft Office application. The commands may correspond to standard Microsoft Developer's Network Software Developer's Kit (SDK) functions or controls, such as the Forward or Back Microsoft Explorer functions. Other actions include sending keyboard commands, requesting an action or message update, shortcut instruction(s) such as an executable file be run or a URL be accessed. In one embodiment, the SDK controls are performed using the appropriate Microsoft Developer's Network Software Developer's Kit call to send direct commands to an application. In other embodiments, macros or key simulations may be used, though these techniques may be less stable than using SDK controls.

An example of a display key definition function having three fields is as follows:

Key(KeyID, MessageID or text, Action/ProfileID or null)

where

KeyID is the identifier for the key being defined

MessageID is the identifier for the message record containing the display content to be displayed on the key being defined Text is a text string to be displayed on the key being defined Action/ProfileID is the identifier for the Action/Profile to be associated with the key being defined. If a 0 is entered, then no action is to be association with the key being defined Because in this embodiment, the message include an Action/ProfileID, there is often no need to separately specify an Action/ProfileID in the key definition. Examples of action/profile files will now be described. Below is a first example of an action/profile script file:

Key(1,fg6576dfg55gd8s,0);

Key(2,kjgh5ghf5fghf876,0);

Key(3,"KARISMATECH",rte434jfghdfhjed);
Key(12,jkhk54646hjghjg,0);
BackgroundSound(thesong.mid);
This example script updates a Key Press Action Table for display keys 1–12 and plays a midi file, "thesong.mid" in the background. As will be described in greater detail below, the Key Press Action table maps states, messages and actions to corresponding keys.

The first key definition is for key 1, which is associated with the content stored in a message having a MessageID "fg6576dfg55gd8s," with no explicitly designated action. The second key definition is for key 2, which is associated with the content stored in a message having a MessageID "kjgh5ghf5fghf876," with no explicitly designated action. The third key definition is for key 3, which is associated with the text "KARISMATECH," and the action/profile having the identifier "rte434jfghdfhjed." The BackgroundSound command is used to call the midi file "thesong.mid"

The above script may be executed, by way of example, when a certain URL, including a domain name, is detected, such as when the Explorer_www.[selected domain name].com/index.html state is detected.

Following is a second example script file including a single command:
SetURL(www.buy.con/product/index.html);
This above example script changes the URL in an active browser executing on the client system. In this example, the script file is named "rte434jfghdfhjed" which is the action/profile object assigned to display key 3 in the first example. The action/profileID may have been set in the Key Press Action table in response to, by way of example, a previous action executed when a related state, such as the Explorer_www.shop.com/index.html state, was detected. The script file is executed when key 3 is depressed, causing the browser to access the Web site located at the URL www.buy.com/product/index.html.

The client software modules will now be described in greater detail. The Cache bank/proxy module manages several caches or banks, including a profile cache, a message cache, and an action cache, from which it correspondingly retrieves and stores profiles, messages for display on the display keys, and actions to be performed in response to a key depression and/or client state. If the client needs a profile or a corresponding message and/or action, not currently stored in the caches, the SIM (Server Interface Module) module connects to the server, if online, and retrieves the necessary profile, message and/or action data which is then stored in the appropriate client cache. If the server is offline, the request is stored in a "Request Box" database (not shown) that is activated when the server goes online. When acting as a proxy, the Cache bank/proxy module provides local client data, pre-empting the sending of queries to the server.

In one embodiment, the Cache bank/proxy receives requests from the Client Manager module, finds the correct object, where an object may be a profile, message, or action, and sends it to the Client Manager module. The Cache bank/proxy caches are filled by the SIM, which retrieves objects over the Internet from the server. If the object is not found in the Cache Bank caches, an error code is returned to the Client Manager module. The Client Manager module then requests the SIM to download that object from the server.

The profile cache includes a profile bank containing profile records. An example profile record includes a Profile ID field used to store an identifier associated with the profile, wherein the profile can be retrieved using the Profile ID. In addition, the profile record includes one or more Message ID or pointer fields, where each Message ID field is used to store a corresponding identifier uniquely associated with one of the display keys. Thus, for example, if the keyboard includes 12 display keys, there will be 12 message identifiers corresponding to the 12 display keys. The profile record includes an Expiration field, used to store an expiration time and/or date for the profile. The expiration time and/or date may be loaded into a watchdog timer. In order to ensure that an up-to-date profile is used an new profile is retrieved by the Client Manager module from the server in response to the expiration date and/or time being reached, as detected by the watchdog timer. In another embodiment, the Expiration field is inspected upon retrieval of the profile record. A new profile record is then retrieved if the Expiration data and/or time has been reached or exceed. In one embodiment, the Profile ID field is 16 bytes, each Message ID field is 16 bytes, and the Expiration field is 6 bytes. Of course, other fields and field lengths may be used as well.

The message cache contains message records or objects. An example message record includes content containing the appropriate text or graphic image to be displayed on the corresponding display key, the effect to be performed on the displayed text and image (e.g. blinking, scrolling, inverse video, etc.), and an action identifier used to retrieve a corresponding action. In addition, the message record contains an expiration date and an expiration action. The Expiration field is used to store an expiration time and/or date for the profile. The Expiration Action field is used to store a pointer to an action which is to be performed once it is detected that the expiration time has been reached. The expiration action may, for example, replace the existing message with a new message or a default message. This ensures that a display key is not left blank even when a message expires. The message is retrieved from the Cache Bank according to its ID. Thus, for example, the message record may include a Message ID field, a Content field, an Effects field an Action ID field, an Expiration Date, and an Expiration Action, as follows:

Message ID: 16 bytes
Content: 132×32 pixel picture (4.125K bit map)
Effect: 2 bytes
Action ID: 16 bytes
Expiration Date: 6 bytes
Expiration Action: 1 byte If the keyboard keys have color displays, an additional byte may be used to specify the color the content is to be displayed in. If the display colors for each pixel may be individual specified, then a nibble or one or more bytes may be used to specify the color of a given pixel.

An action record includes the action script file and an action ID or pointer. In one embodiment, rather than having a separate profile record and action record, the functions of the two are combined in one record or object type, termed an action/profile record or object. The action/profile object is given a unique name, termed the action ID, by which it may be retrieved. The action/profile object is written as a script file including one or more commands and a message pointer or message ID and an expiration date and/or time. The action/profile commands may be application commands that are performed in response to a key activation and/or in response to a certain client state. One or more of the commands may be unrelated to the keyboard functions. For example, the action/profile object may be used to call an audio file, such as an MPEG file, to be played in the background. Thus, an action/profile object is a collection of key definitions for one or more keys and/or a set of system or application commands to be performed.

The Client State Detector Controller detects the state of the client. For example, in the case of the Internet browser, the state can be the presently active URL. If the client is presently in a Microsoft Office application, the state indicates the menu where the application is presently active. For example, in the case of Microsoft Word, the active menu may be the format style dialog box or some other dialog box. The state also may include the current date and time. As previously discussed, the state may be used in selecting which profile or action/profile is to be used, and hence, what is to be displayed on the display keys.

When a display key is activated or depressed, the client-side Event Logger module identifies the command(s) executed and stores the related details in the log or history file. For example, the date and time the display key was activated, a user ID of the user logged in to the client software, the machine or client state, the display key and or non-display key pressed, and if a user-defined action/profile is being used for the display key, the actions performed is also recorded. Subsequently, on the server side, the log file is analyzed and the user profile information updated accordingly. The log file is periodically sent to the server for analysis. The time and frequency with which the log file is transmitted to the server may optionally be definable by the user and/or the server software. For example, the user may select a time when the user is generally not using the client system.

In addition to the processes described above, the Client Manager module is used to allow different users to log in to the client software so that different profiles may be used for the different users. To log in into the system or to log in as a different user, the user presses a designated key, such as the Home key. In response, the Client Manager module causes a screen to be displayed on the client monitor or on the display keys listing users who have associated accounts. The user may then select one of the listed users my highlighting the user and pressing an appropriate mouse or keyboard key.

The client software includes several mapping or linking tables, including a User table that maps users to corresponding user IDs, a State map that maps states to corresponding profile IDs, and a Key Press Action table that maps states and messages to corresponding actions that will be performed when an appropriate display key is activated.

The User table contains the names or user identifiers of users working on one client or registered with the client software. The User table is populated during a user registration process. The User table maps the user name or identifier to a default profile or action/profile associated with that user. The default profile or action/profile takes effect when an undefined state is detected or a state is detected that does not have explicitly defined profile or action/profile associated with it. The table is optionally configurable by the user. Thus, each user has his or her own default profile or action/profile, which is loaded automatically upon login. The mapping function is as follows:

User→Profile $ID$ (Default profile of that user)

If the action/profile object type is used then:

User→Action/Profile $ID$ (Default Action/Profile of that user)

The state table maps or links a profile ID or action/profile ID to a particular state and optionally a specified user. For example, User=John
State=Explorer_www.yahoo.com/sports/indx.html
Action/Profile ID=TgHfgFGgf453tfHY
Expiration=Nov. 11, 2000

Thus, when the user is John and State(Explorer_www.yahoo.com/sports/indx.html) is detected, the profile associated with Action/profile ID: TgHfgFGgf453tfHY is used, so long as the expiration date of Nov. 11, 2000 has not been reached. The State table is optionally configurable or populated by the user and/or the remote server. The state and profile mapping are selected so that the appropriate displays and actions will be active for a given state and user. By way of example, if the state indicates that the Microsoft Word application is active, the linked profile will be associated with appropriate text for display on display keys. For example, the text associated with the profile may cause the text "Save" to appear on a first display key, "Print" to display on a second display key, and "Spell Chk" to display on a third display key.

Because the State table mapping is also optionally based on the user, for a given state there may be different mappings depending on the user. If the profile object is used, the mapping function is:

State+User→Profile $ID$

If the action/profile object is used, then the mapping function is:

State+User→Action/Profile $ID$

In one embodiment, the State table has two additional values for a defined state, an Empty state and a Free state. A state is designated as Free if it is a state for which no profile or action/profile has been requested from the server. This is the default of all states until such a request has been made. A state is designated as Empty if it is a state for which an action/profile or action was requested from the server; but the server did not have an action/profile defined for that state. Optionally, a state may be designated as Empty if there had been an associated action/profile, but the action/profile has expired.

Because Empty or Free states are not yet attached to an action or message, the user can build his own actions and messages, and attach them to an Empty or Free state. In addition, the user may receive control of some of the display keys, allowing him to dynamically define actions for these keys. The user definition may optionally be set to automatically expire after a given time, for example, after two months. Optionally, the server may regain control of the user defined keys by assigning content and actions to the user defined keys.

The Key Press Action table links the state and the message (picture and effect) to the action that will "run" when a display key is pressed or activated. A table lookup occurs when a display key is pressed. The Key Press Action table is updated dynamically, as a result of previous actions whose occurrence are stored in the log. The mapping function is:

Profile $ID$+Key Pressed→Action $ID$

If the action/profile object is used, then the mapping function is:

Key Pressed→Action/Profile $ID$

The client Action API sends and requests information from the server, specifies the server IP address, and retrieves events from the server.

In addition, the client software includes a message editor, which translates written text to the graphic format corresponding to the displays with the display keys. For example, where the pixel displays have a 132×32 bit map, the message editor converts the text message into a 132×32 pixel format suitable for display on the display keys. This allows users to define their own keys and corresponding messages.

Figure 1B:
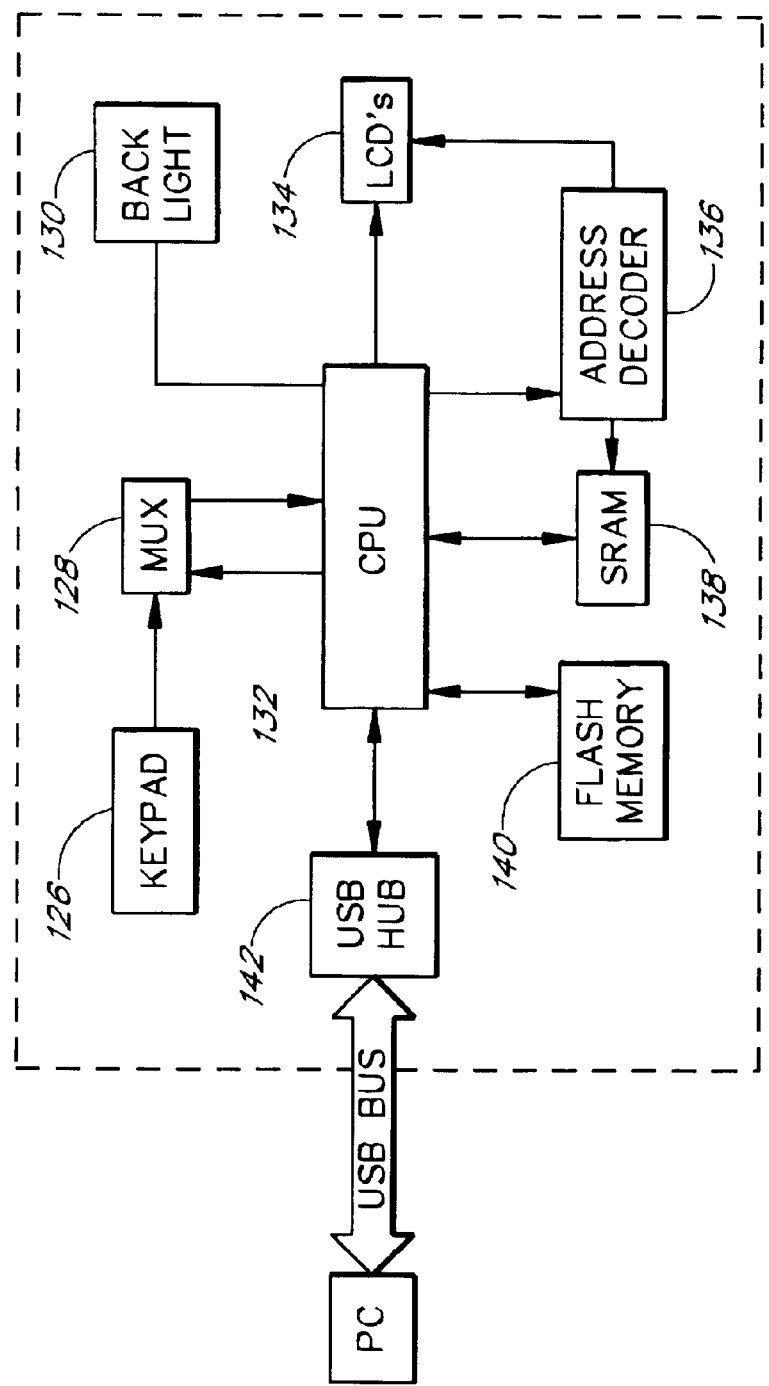
FIG. 1B illustrates an exemplary keyboard hardware architecture which may be used with one embodiment of the present invention.

The keyboard hardware architecture will now be discussed with reference to FIG. 1B. As illustrated, the keyboard functions are managed by a central processing unit (CPU) 132 which may be a EZ-USB AN2131Q CPU from Anchor Chips, integrating an Intel 8051 compatible microcontroller and including hardware support for low-level USB signaling and supporting USB enumeration. In other embodiments, the CPU 132 may be a general purpose microprocessor, microcontroller, or the like. The CPU 132 is connected to the keyboard keypad 126, including the display keys, via a mux 128. The mux 128 is used to scan the keyboard matrix so that the CPU can debounce the keys and generate a scan code, which is then sent by the CPU 132 to the client computer via a USB hub 142. As with a conventional personal computer, the client computer includes a keyboard controller, such as one that emulates the Intel 8042, that receives the scan code and signals the client computer processor using a hardware interrupt dedicated to the keyboard (IRQ1). The client computer processor then interprets the key pressed and takes the appropriate action. In addition, the client Manager module monitors which keys are pressed so that it can perform the previously described operations.

The CPU 132 is also connected to the display key backlight 130, wherein the CPU 132 can turn on or off display keys backlight 130. The backlights may be implemented, by way of example, using a Densitron backlight, part number, SY-BLA6006. In one embodiment, each display key has a separately controllable backlight. This allows the backlight 132 to be simply turned on during use, or allows for special effects, such as flashing the backlight on and off at a selected frequency for a selected display key.

The CPU 132 is connected to the display keys displays 134 to write or read the bit maps to the key displays 134, which, in this embodiment, are composed of LCD pixel matrix displays. The backlights may be implemented, by way of example, using a Densitron LCD display, part number, SY-LM3081. The LCDs contain internal RAM memory to hold the bit maps. The CPU 132 is connected to an address decoder 136 as well. The address decoder decodes the addresses provided by the CPU to correspondingly enable the correct LCD display so that pixel display data provided via the CPU 132 is written for display to the correct LCD memory location.

Volatile memory in the form of static RAM (SRAM) 138 is provided as working memory for the CPU 132. In one embodiment, upon a USB connection being completed with the client computer, firmware code, including default USB descriptors, is automatically downloaded into the SRAM 138 from the client computer. In addition, as part of the initialization procedure, CPU registers LCD registers, and variables are initialized. The address decoder 136 decodes the CPU 132 address and to appropriately enable the SRAM 138. Non-volatile memory 140, in the form of Flash memory 140 or the like is used to store the CPU program code, as well as default profiles, messages, and/or actions.

In addition, the Flash memory 140 may be used to store a unique keyboard ID, thought the keyboard ID may also be hardwired on a keyboard circuit board or within a chip. Optionally, the first time a user operates his keyboard, the user is assigned a unique User ID that will be linked to the keyboard's ID. For example, the User ID may be the output of a random number generator that uses the keyboard ID as a seed. This prevents someone from determining the actual identity of the user from the keyboard ID, thereby protecting the user's privacy. However, the keyboard ID may be used as part of fraud protection to determine if the keyboard is a counterfeit or an unauthorized keyboard. The registration process will be initiated at the client, but recorded at the server.

The Flash memory 140 may optionally include a serial read/write port. In another embodiment, the keyboard ID may be hard wired on the keyboard circuit board or within a semiconductor circuit.

Figure 1C:
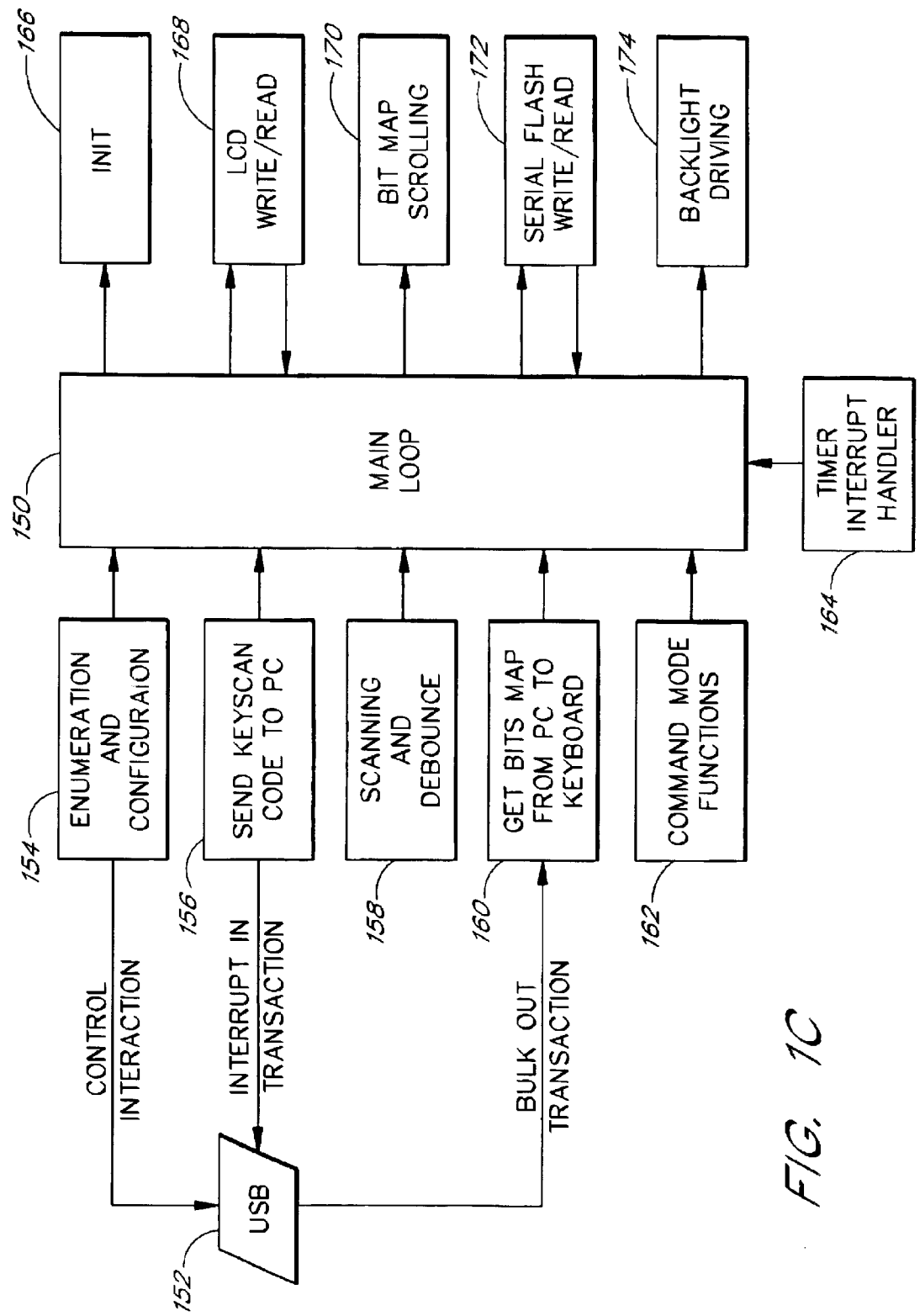
FIG. 1C illustrates an exemplary software keyboard architecture which may be used with one embodiment of the present invention.

FIG. 1C illustrates an example software architecture for the keyboard. The modules are executed by the keyboard CPU 132. A main loop module 150 runs the background keyboard tasks. Foreground tasks performed by other modules operate on an interrupt driven basis. Thus, the modules are event driven and are activated by external interrupts, CPU external inputs or timer interrupts. Inter-task communication is performed via one or more state machines.

Enumeration and Configuration module 154 performs the enumeration and configuration functions in accordance with USB standard v1.1 and is used to set up the USB communication process. The Enumeration and Configuration module 154 sends and receives control transactions to the USB module 152. As previously discussed, upon USB connection being established, firmware is downloaded from the client computer. The downloaded firmware supports the enumeration and configuration modes. The Enumeration and Configuration module 154 responds to standard USB requests from the client computer and sends standard USB device descriptors to the client computer. In addition, module 154 sets up packet-type definitions, handles USB handshaking, including the Acknowledge, Non-Acknowledge, and Stall states, and sends USB status.

Module 156 is used to send the keyboard scan code from the CPU 132 to the USB module 152 for transfer to the client computer. Module 156 generates an interrupt to the USB module when there are scan codes to transfer. Module 158 performs standard keyboard scanning and debouncing functions. Module 158 periodically checks the keypad for changes and debounces the keypad readings to eliminate false readings. Module 160 is used to get keyboard display bit maps using a Bulk Out transaction from the client computer via the USB module 152. The bit maps are temporarily stored in a FIFO, and are later copied into a buffer.

Module 162 performs command mode functions. In this embodiment Module 162 is an application level protocol implementing command mode operation for LCD control. The command is implemented by a control output transaction. For example, the Module 162 may perform the following functions in response to client computer instructions:

Set current LCD
Set LCD RAM address
Set LCD scrolling mode
Get LCD display status The Init module 166 performs the initialization functions described above, including register and variable initialization. The LCD Write/Read Module 168 writes and reads to the LCD displays. In this embodiment, the LCD displays are memory mapped devices and are written to and read from as such by the LCD Write/Read module 168. Bit Map Scrolling module 170 performs the LCD display scrolling function. The Serial Flash Write/Read module 172 performs the serial writes to and reads from the keyboard non-volatile Flash memory.

The Backlight Driving module 174 controls a cyclic signal used to either have keyboard display backlights lit in a steady state condition, or to have the backlights flash on and off at a given repetition rate. In one embodiment, in order to have the backlight constantly lit, the Backlight Driving module 174 generates a 50 Hz signal for backlight driving. The Timer Interrupt Handler module 164 handles interrupts for the LCD backlights and keypad scanning.

Figure 3:
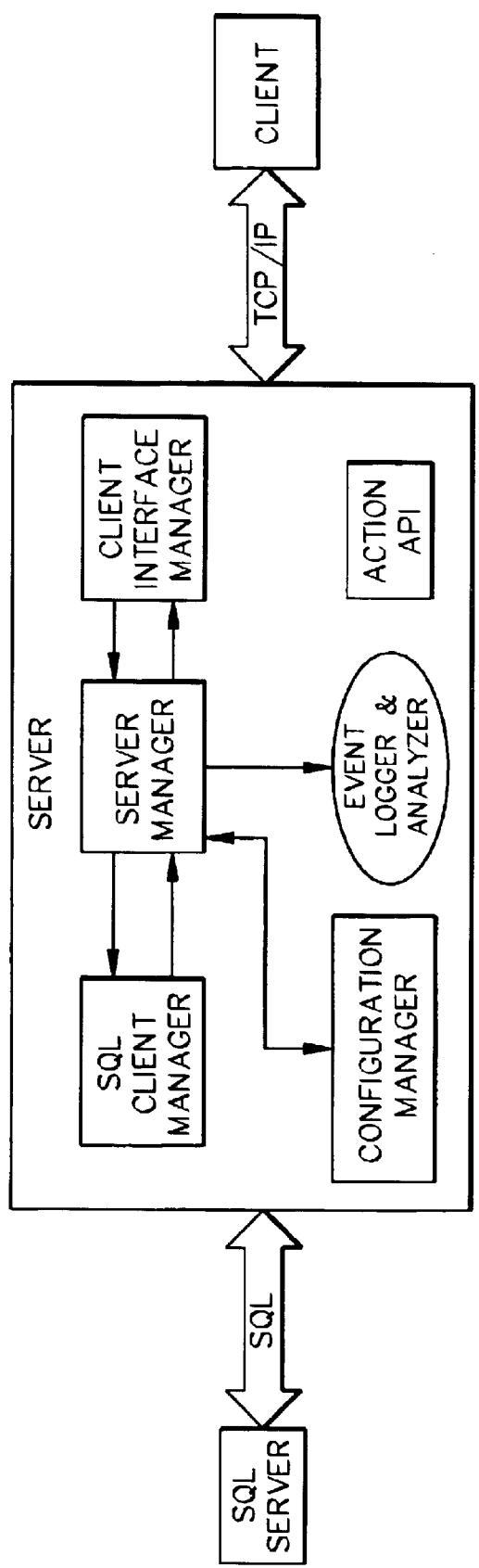
FIG. 3 illustrates an exemplary server architecture suitable for use with the networked system of FIG. 2.

The server system illustrated in FIG. 3 will now be described. The exemplary server system includes a variety of software modules stored in the server memory and executed by the server. The server generally receives client requests or client information over TCP, such as a client log file, via the Internet in a defined port using the communication protocol discussed below. Upon receiving a client request, such as for a profile, message, action, and/or other object, the server analyzes the request and responds with an appropriate answer. If the server receives a client log file, the log is analyzed by a Event Logger and Analyzer module. The server correlates requests and objects using configurable correlation tables stored in a separate SQL/Oracle server. The server may also be networked to receive content from computers associated with other entities. In addition, the server tracks user accounts, generates and stores profiles, actions, and messages, including advertisements. The SQL server used to store the SQL database may be either local to the server, or may be accessible to the server over one or more local area networks (LAN) or wide area networks (WAN).

The exemplary server includes a Client Interface Manager module, a Server Manager module, an SQL Client Manager, a Event Logger and Analyzer module, a server Action API module, a Configuration Manager and the SQL server containing one or more SQL databases. In addition, the server may include Microsoft's Internet Information Server software. The database is used to store ads and other media content, as well as user account information. The database may also store account balances associated with the ads, the length of time the ads are to be displayed, and information relating to the desired target audience. In addition, user-related information, including user identifiers, user income, user interests, user buying habits, and ad identifiers for ads currently being displayed on the user keyboard, are stored as well. The databases may be implemented using Structured Query Language (SQL) code, used for defining, updating and querying relational databases. For example, the databases can be implemented with any number of commercial database programs including Microsoft SQL Server, Oracle's relational database products and the like.

In one embodiment, the ads or other content are provided by the server in response to a client request. This is referred to as an "upon-demand" system. The server interface manager module located in the client system connects to the server across the network and generates a request, such as an ad or message request, a profile request, and/or an action request, which is received by the Client Interface Manager module on the server side. The server responds to the request by providing the requested information, such as one or more ads or other displayable media to be displayed on appropriate client keyboard display keys. The message or ad may be provided using ASCII, HTML, XML, other scripting languages, bit mapped data, and/or using other data formatting techniques. Each message may optionally have an ad-specific identifier associated with it, so that the presence of the ads may be tracked by the server.

In particular, in one embodiment, in response to receiving an object request from the client the server locates the requested object by querying the SQL server. The request includes the User ID and the Object Requested Type and the Object ID, described in greater detail below. The SQL query is built from the User ID or a Group ID and the Object requested type (profile, message or action) and Object ID. The group ID is used to aggregate a group of users and associate them with common characteristics/actions. This allows, for example a common action/profile and/or message to be assigned to all users in a group. For example, the group may be defined geographically, such as all users in Manhattan. When a sale at a Manhattan store occurs, the same message regarding the sale can be automatically sent out for display on a display key of all group members.

An object can be a fixed object that does not depend on the User ID, or can be a changing object that will consider the User ID, a Group ID, or other randomization mechanism. In response to a request for a changing object, the server finds a group ID associated with that user ID and then randomizes an object that is in that group. For example, for the same state, based on the user or group ID different versions of an ad will be provided. This feature, based on the SQL query language, provides a great degree of flexibility in customizing actions for individual users and/or groups of users. The actions can be configured on the basis of previously performed actions, such as those recorded in the log.

The server analyzes client requests and redirects the request to the appropriate SQL query that deals with that type of request. In one embodiment, an appropriate SQL Query table is defined in the SQL server which translates protocol content into SQL queries.

Following is a description of an example SQL Query table. The SQL Query table has the following fields:

ObjectType, From *ID*, To *ID*, *SQL* Script

When a request for an object is issued the following parameters will be supplied: ObjectType and ObjectID. These parameters will be the input for the table lookup The Result is one object and is the SQL script to be preformed. For example:

| Type | From ID | To ID | SQL Script |
| --- | --- | --- | --- |
| Action | 0 | L | Select from . . . |
| Message | 0 | M | Select from . . . |
| Message | aaaaaaaaaaaaaaa | zzzzzzzzzzzzzzz | Select from . . . |

Thus, actions or messages having IDs within a specified range of IDs may be associated with a single SQL script.

By way of example, if the original request is: ObjectType="State" and the ObjectID is the StateID, the initial SQL request will be USER+STATE→ActionID. The ActionID is then requested again from the SQL Server, this time: ActionID→Action1/Action2/Action3 (this query could have been received directly if the initial request was: ObjectType=Action, ObjectID=ActionID). The recent profile was a multi-action ActionID. In this query one of the returned Actions will be randomized and sent back to the client as a response to his initial request.

The tables can be configured and populated via the Configuration Manager module, which may be optionally executed on a separate server. The Configuration Manager module updates the tables stored on the SQL server via SQL queries. In addition, the tables can be updated manually using SQL commands.

The client media request may include a variety of information. The request may include a user identifier, if one exists. In addition, user relevant data, such as the URL of the current site being accessed by the user and/or the URLs of sites recently accessed, may be included. Client module data, including the working mode or state, identifiers associated with ads or other content currently being displayed and the location of those ads, or content may be provided as part of the log file as well. Other relevant data, such as hardware and/or software configuration information, information concerning applications opened on the client side, and so on, is also optionally provided.

Once the Server Interface Manager module executing in the client system receives the content data, such as an ad or other display data, the data is parsed and routed via one or more keyboard device driver layers to the appropriate location, such as a key display. Because the content is downloaded to the client system, the advertisements or other content may optionally be displayed even when the user is not accessing the network. The keyboard device driver allows the client operating system to access the key displays and informs the operating system when and which key has been depressed. In addition, in one embodiment, the server may provide instructions which cause ads or other content already stored on the client side to be displayed on appropriate client keyboard keys. Using the editor described above, the ads or other content stored on the client side may optionally be modified by the user, in terms of font type, font size, color (if the key display supports color) and so on. In addition, the server may include a message converter module which translates content from one format to another. For example, if the content is in BMP format, the converter module converts into a format suitable for the key displays. For example, if the key display is a 132×32 pixel array, where each pixel only has an off and an on state, the BMP file is converted into 132×32 black and white pixel format. Similarly, if the key display is capable of displaying colors, the content will be appropriately converted for display on the color-capable displays.

The server response to the client request includes a header and trailer, including data. The header includes information relating to the attached data. The information includes information about the data type, where the data is to be displayed, how long the data is to be displayed, the data blink rate, if any, and so on. The server response may include one or more commands or actions. These commands may include one or more URL to be accessed upon activation of the corresponding key. The commands or actions may also cause one or more applications, such as a browser, to be launched. Information regarding the server settings may be included as well. The response data may include media content, such as one or more advertisements to be displayed on corresponding keyboard keys. The media may include text and/or graphic symbols.

Figure 7:
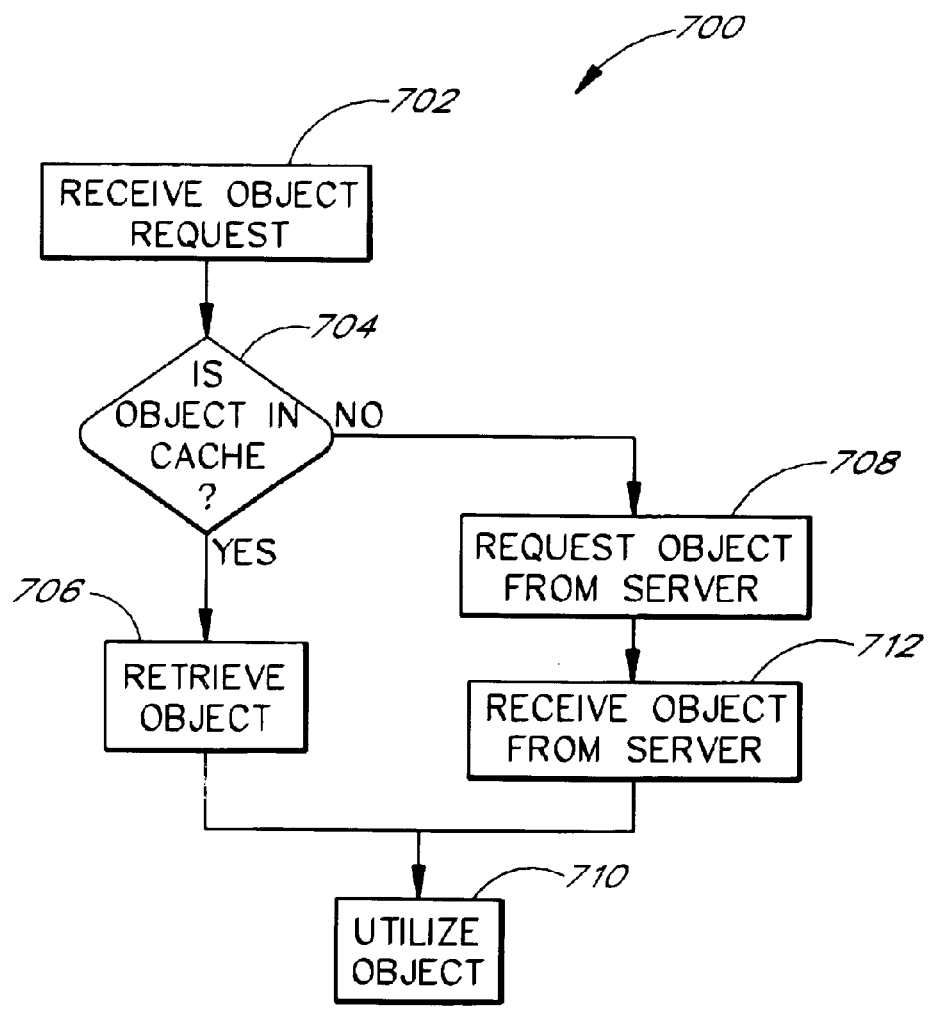
FIG. 7 illustrates a process for obtaining keyboard related data from a server.

An example communication protocol between the client and server will now be described, with reference to FIGS. 4A–D, 5A–D, and 7, though other protocols may be used as well. FIG. 7 illustrates a sample communication process 700. Beginning at state 702, the Cache Manager receives a request for an object, such as a profile, message or action, from the Client Manager module. At state 704 a determination is made as to whether the requested object is in the corresponding cache. If the object is in the cache, then the object is retrieved in state 710 and is appropriately utilized at state 710. Otherwise, if the requested object is missing (or expired) from the Cache Bank, at state 708 the Client Manager module sends a request for that object to the server using the protocol. The request indicates the missing object type (profile, state, action) and a unique ID. The object is received by the client from the server at state 712, and the object is utilized at state 710. As described below, the protocol is also used to deliver files, such as log files, from the client to the server.

In this embodiment, there are 4 types of communications, as follows:
1. Request—A request from the client to the server for an object
2. Response—An object sent to the client from the server, according to client request
3. Send—A file, such as a log file, sent from the client to the server
4. Ack—acknowledgement by the server that the file sent by the client was received A server side Action API provides the Response and Acknowledge functions, as well as an Init function that species the server IP address, and an optional Callback function that retrieves events from the client.

As illustrated in FIG. 4A, each communication includes a protocol header including a version field used to contain the version number and the communication or command field used to store the command type (Request=1, Response=2, Send=3, Ack=4). The version field is for backward compatibility with future versions. The command entered into the command field determines the structure of the rest of the fields.

For example, FIG. 4B illustrates a request trailer, including a User ID field, an Object Type field, and an Object ID field. The User ID field is used to contain the User ID of the user currently logged in to the system. The Object Type field is used to speciy which type of object is being requested by the client using either ASCII code or other code (Profile=1, Message=2, Action=3). The Object ID field is used to specify the specific ID of the requested object.

FIG. 4C illustrates a response trailer. The Object Type field is used to specify which type of object is being sent by the server to the client (Profile=1, Message=2, Action=3). The Object ID field is used to specify the specific ID of the object being sent. The Object field contains the object being sent.

FIG. 4D illustrates a Send trailer. The User ID field is used to specify the User ID of the user associated with the file being sent by the client to the server. The file type field is used to specify the file type being sent by the client (Log file=1, Cookie file=2, etc.). The size field is used to specify the file size in bytes, and the file field contains the actual file being sent.

In this example, there is no trailer associated with the Ack command.

In one embodiment, one or more of the protocol formats discussed above includes a error detection and correction field which allows transmission errors to be detected and corrected by the recipient.

FIGS. 5A–5D correspondingly illustrate examples of a client request, server response, sending of a file by the client, and an acknowledge communication. Specifically, FIG. 5A illustrates a version 1.0 client request by a user having a User ID 1fd5422, for an object type "message," with an object ID of Hgf32FdF. In response, the server sends the communication illustrated in FIG. 5B, including a version 1.0 server response, of object type "message," having an object ID Hgf32FdF, and the message.

FIG. 5C illustrates sending a file, in this example a log file, by the client to the server, including a version 1.0 client send command, for a user having a User ID 1fd5422, of file type log, 20 Kbytes in size, and the log file. FIG. 5D illustrate an acknowledge communication.

The protocol is used to communicate information over a TCP/IP connection. When an object is needed the client builds the connection to the server (the IP of the server is defined in advance). The client sends a Request or Send communication over the connection, and waits for a Response or Ack communication. If none is received after a fixed time the client will repeatedly try again for a predetermined number of times. If a response or acknowledgement is still not received, the client disconnects and the Client Manager returns an error code to the client API.

More then one request is possible during one connection. For example, if the Request is for a profile, the Client Manager module will automatically request the messages in that profile.

As previously discussed, the client request may be generated in response to one or more occurrences or machine or client states, including the client date and/or time. For example, the Client Manager module includes a sub-module which periodically reads the computer's calendar and clock to determine the date and time. The Client Manager module may then initiate a request at predetermined dates and/or times or within a range of dates or times. If the server is not in operation when one of these times has occurred, the Client Manager module may initiate a content request when the sever is operational. Thus, for example, the Client Manager module may initiate a request for additional advertising or other content from the server on a hourly, daily, weekly, and/or monthly basis. The times may be programmably set by the client-side software provider, the keyboard supplier, the server, and/or the user. Further, the request may be directly and/or manually initiated by the user. In one embodiment, these times may be dynamically changed by the server.

In addition, the Client Manager module may be programmed to initiate requests during special shopping seasons, such as Christmas or Thanksgiving. This permits time sensitive advertising to be efficiently provided. For example, the Client Manager module may initiate a request to the advertising server a week before Thanksgiving. In response, the server provides ads, including related macros, for food products and the like. Thus, for example, an advertisement for "Free-range Turkey" may be transferred from the server to the client for display on a keyboard key. When the user presses the key displaying the phrase "Free-range Turkey" the user will automatically be presented with a web page for the retailer selling the free-range turkey. The user may then order the turkey from the site.

In addition, the client may initiate a request in response to the user launching an application on the client computer. For example, a request for ads may be initiated in response to the client launching a web browser or an e-mail program. Furthermore, the request may be initiated upon the occurrence of a specific time or range of times in combination with the launch of an application.

In another embodiment, a content push system may also be used, where the server initiates the transfer of content, such as for example, ads for on keyboards. Thus, optionally data may be pushed unto the client keyboard displays without an explicit client request. The client system may notify the remote server of the client's presence on-line, with or without a specific log-in process), or the remote server may detect the online presence of the client system via polling. In an exemplary embodiment, the client accesses the Internet and opens a connection to the server. The client "stays tuned" until disconnected from the Internet. While the connection is open, the server sends messages to the client. In one embodiment, the messages include a header and trailer, including data, as previously described. In addition, this technique provides for real time messaging of data from the server to the client keyboard, where the data may originate from a third party. For example, the user may ask his or her brokerage house to provide notification when a certain stock price reaches a certain price. Upon such an occurrence, the brokerage can forward a corresponding message to the server, which in turn pushes or streams the data and effect, such as a flashing light, onto a designated display key within 5 seconds of the time the data was provided by the brokerage.

The server pushes content such as ads onto the client for display on keyboard keys in response to one or more conditions. For example, the server may monitor the sites accessed by the client, and based on the monitoring, select which ads to transmit to the client. The server may also push ads onto specific clients or types of clients in response to advertiser specifications or requests using information stored in its database. The specification may include geographic location, user gender, age, marital status, education, income level, and so on. For example, the server may push an ad for the Hollywood Bowl to all clients in the greater Los Angeles area with an income of greater than $40,000. By way of another example, the server may push an ad for dresses to all women who live within 3 miles of a retail establishment associated with the advertiser. In still another example, an ad for a dating service may be pushed onto the keyboard of user's who are single and over 30 years old.

Thus, the above system can be used to rent or lease key display space on a time limited basis. The advertiser or other content provider can have a long-term "lease" on the key display, or a short term lease depending the advertiser's needs and budget. The advertiser can set up an account with the server operator, and have appropriate amounts deducted from the account. Thus, the advertisement can be displayed while the keyboard is powered for varying amounts of time, such as seconds, minutes, hours, days, weeks, months or years, or perpetually. In addition, the advertiser may also be charged for each time a user activates a keyboard key display media associated with the advertiser. In addition, the advertiser may be charged different rates for different users. For example, a higher rate may be charged for males between 18 and 35 then for males between 40 and 60.

The advertiser can set up an account with the server operator, and have appropriate amounts deducted from the account as ads are posted on various user keyboards. The amount charged to the account may be based on the number of users on whose keyboard the advertisement is displayed, the amount of time the advertisement is displayed, and/or the number of times users access the advertiser's web sites by activating the corresponding keyboard key incorporating a display.

The advertiser's company or product name can appear as a permanent or semi-permanent sponsor of the user's keyboard. The company may provide or cause the keyboard to be provided for free or for a reduced or subsidized price in return for having the company's media content displayed on one or more key displays.

In one embodiment, the ads or other media content can blink, flash, scroll in one or more directions, and so on, so as to better capture the user's attention. In the case of backlit key displays, the flashed may be performed by rapidly turning the backlight on an off. For LED or FED based displays, the pixels themselves may be turned on and off.

Contests, coupons, or give-aways may be displayed and optionally flashed or blinked on one or more key displays to help keep users looking at the key displays and associated advertisement. For example, when the user activates a key displaying a contest, the user may be automatically entered in the contest. Similarly, if a coupon advertisement is displayed, the user may earn the coupon by hitting the key. The coupon may be an electronic coupon, a downloadable coupon, or a coupon mailed to the user. In addition to advertisements, the keys may display URLs, links, portals, initiate e-commerce activities, and so on.

Thus, as described above, the present invention provides increased functionality and ease of use. All or some of keyboard keys with displays may be dedicated to advertising. Keys not dedicated to advertising may be used by the user to launch the user's or other programmable macros to perform a desired function. Thus, in addition to being useable to display advertising, the keyboard may also be used as a conventional device.

Furthermore, in one embodiment the client side modules can automatically identify those applications already installed on the user's computer and autonomously adapt the interactive keys to display functions and commands pertinent to the application being used. Similarly, the keyboard keys can mimic the interfaces, such as menus, of Internet sites. By displaying the various menu functions and commands inside its easily accessible and conspicuous interactive buttons, the performance of routine surfing and working tasks, such as online shopping, is greatly facilitated, thereby dramatically increasing application efficiencies and added value to the user.

While certain preferred embodiments of the invention have been described, these embodiments have been presented by way of example only, and are not intended to limit the scope of the present invention. Accordingly, the breadth and scope of the present invention should be defined only in accordance with the following claims and their equivalents.

What is claimed is:

1. A method of communicating information over a network between a remote server and a client computer keyboard system, comprising:
   receiving an identifier associated with a user of the client computer;
   identifying a state of the client computer;
   requesting from a client-side keyboard message cache a message to be displayed on a display of a keyboard key and an action to be associated with the keyboard key, wherein the request is based at least in part on the identifier and the state of the client computer;
   determining if the requested message and action are in the cache;
   upon determining that the requested message and action are in the cache, retrieving the message and action from the cache, displaying the message on the keyboard key display, and performing the action at least partly in response to the keyboard key being depressed; and
   upon determining that the requested message and action are not in the cache, requesting the message and action from the remote server, receiving the requested message, displaying the message on the keyboard key display, and performing the action at least partly in response to the keyboard key being depressed.

2. The method as defined in claim 1, further comprising requesting a second message at least partly in response to an expiration time being reached for a previous message.

3. The method as defined in claim 1, further comprising executing a browser on the client computer, wherein the state of the client computer is related to which address that the client browser is currently accessing.

4. The method as defined in claim 1, wherein the state of the client computer is related to what application software is currently active on the client.

5. The method as defined in claim 1, wherein the message is in a bit mapped format.

6. The method as defined in claim 1, wherein the action is a browser command.

7. A method of communicating information over a network between a remote server and a client computer keyboard system, comprising:
   determining a state of the client computer;
   requesting from a client-side cache a message to be displayed on a keyboard key display and an action to be associated with the keyboard key, wherein the request is based at least in part on the state of the client computer;
   determining if the requested message and action are in the cache;
   upon determining that the requested message and action are in the cache, retrieving the message and action from the cache and displaying the message on the keyboard key display and executing the action on the client; and
   upon determining that the requested message and action are not in the cache, transmitting over the network a request for the message and action to the remote server, receiving the requested message and action from the remote server, executing the action on the client, and displaying the message on the keyboard key display.

8. The method as defined in claim 7, wherein the message includes a name of a first networked site.

9. The method as defined in claim 7, further comprising requesting a second message in response to the client computer being in a second state.

10. The method as defined in claim 7, further comprising:
    recording on the client computer a record of a plurality of activations of the display key; and
    transmitting the record over the network to the remote server.

11. The method as defined in claim 7, wherein the keyboard key display is visible on a face of the keyboard key.

12. A method of communicating information over a network between a first computer and a second computer, the second computer including a keyboard system having keys with key displays, comprising:
    receiving at the first computer a log from the second computer, the log including a history of at least one display key activation;
    based at least in part on the log, selecting content and a related action wherein the content is intended to be displayed on a keyboard key display and the action is intended to be performed by the second computer in response to the display key being activated; and
    transmitting the selected content and action over a network to the second computer.

13. The method as defined in claim 12, wherein the first computer initiates a transfer of real-time content to the second computer.

14. The method as defined in claim 12, further comprising transmitting to the second computer expiration data for the selected content.

15. The method as defined in claim 12, further comprising transmitting to the second computer a display effect for the selected content.

16. The method as defined in claim 12, wherein the action is implemented as a script file.

17. The method as defined in claim 12, wherein the selected content was received by the first computer from a content provider.

18. A method of providing data over a network to a computer keyboard, the method comprising:

determining that a client computer is accessing a first network site, wherein the client computer has a keyboard including at least a first key with a programmable key display;

selecting a first media to be displayed on the first keyboard key's programmable key display, where the selection of the first media is based at least in part on the determination that the client computer is accessing the first network site; and displaying the first media on the first key's programmable key display and maintaining the display of the first media on the first key's programmable key display when the client computer is accessing a second network site.

19. The method as defined in claim 18, further comprising receiving an identifier associated with the keyboard.

20. The method as defined in claim 18, further comprising receiving an identifier associated with a client computer user, wherein the selection of the first media is based at least in part on the identifier.

21. The method as defined in claim 18, further comprising receiving a client user's definition of media to be displayed on a second key having a programmable key display.

22. A method of communicating information over a network between a first computer and a second computer, the second computer including a keyboard system having keys with key displays, comprising:

detecting the online presence over the network of the second computer by the first computer;

selecting content by the first computer based on at least one of a geographical location of the second computer, the current date, and information related to the user of the second computer; and transmitting the content by the first computer over the network to the second computer for display on at least one keyboard key having a key display.

23. The method as defined in claim 22, wherein the content includes a plurality of messages.

\* \* \* \* \*

UNITED STATES PATENT AND TRADEMARK OFFICE
CERTIFICATE OF CORRECTION

PATENT NO.   : 6,834,294 B1
DATED        : December 21, 2004
INVENTOR(S)  : Samuel M. Katz It is certified that error appears in the above-identified patent and that said Letters Patent is hereby corrected as shown below:

<u>Title page,</u>
Item [75], Inventors, delete "Samuel F. Katz" and replace with -- Samuel M. Katz --.

Signed and Sealed this

Seventeenth Day of May, 2005

JON W. DUDAS
*Director of the United States Patent and Trademark Office*